(12) United States Patent
Musch et al.

(10) Patent No.: US 7,767,737 B2
(45) Date of Patent: *Aug. 3, 2010

(54) AQUEOUS ADHESIVE DISPERSIONS

(75) Inventors: Rüdiger Musch, Bergisch Gladbach (DE); Knut Panskus, Leverkusen (DE); Dietrich Pantke, Ratingen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/447,753

(22) Filed: May 29, 2003

(65) Prior Publication Data

US 2003/0221778 A1 Dec. 4, 2003

(30) Foreign Application Priority Data

Jun. 4, 2002  (DE)  ................................ 102 24 898

(51) Int. Cl.
   *C08J 3/215* (2006.01)
(52) U.S. Cl. ........................ 523/334; 524/493; 524/567; 156/60; 156/349; 428/426; 428/446; 428/448; 428/500
(58) Field of Classification Search ................. 523/384, 523/334; 524/567, 261, 493, 273, 507, 384; 156/60, 349; 428/426, 446, 448, 500
See application file for complete search history.

(56) References Cited

U.S. PATENT DOCUMENTS

| | | | | |
|---|---|---|---|---|
| 4,042,554 A | * | 8/1977 | Poskitt | ........................ 523/337 |
| 4,742,137 A | * | 5/1988 | Ono et al. | ...................... 526/92 |
| 4,992,481 A | | 2/1991 | von Bonin et al. | ............ 521/54 |
| 5,017,630 A | * | 5/1991 | Raines et al. | ................ 523/334 |
| 6,017,998 A | * | 1/2000 | Duan et al. | .................. 524/591 |

FOREIGN PATENT DOCUMENTS

| | | |
|---|---|---|
| FR | 2210699 | 7/1974 |
| FR | 2341537 | 9/1977 |
| JP | 6-256738 | 9/1994 |

OTHER PUBLICATIONS

Handbook of Adhesives Irving Skeist Chapman, Hall, New York, $3^{rd}$ ed. (month unavailable) 1990, p. 301, "Neoprene (Polychloroprene)-Based Solvent and Latex Adhesives".
R. Musch et al., Adhesive Age, Jan. 2001, pp. 17-22 "High-Yield Bonds".
"Spray-mixing adhesives based on Dispercoll® C for foam bonding", technical information from Bayer AG, No. KA-KR-0001e/01/05/.96.

* cited by examiner

*Primary Examiner*—Peter D Mulcahy
(74) *Attorney, Agent, or Firm*—Robert S. Klemz; Noland J. Cheung

(57) ABSTRACT

Aqueous polymer dispersions based on polychloroprene, and a process for their preparation and use. The aqueous polymer dispersions are produced from a polychloroprene dispersion having an average particle size of from 60 to 220 nm, and an aqueous silicon dioxide dispersion having an $SiO_2$ particle diameter of from 1 to 400 nm.

18 Claims, No Drawings

AQUEOUS ADHESIVE DISPERSIONS

CROSS REFERENCE TO RELATED PATENT APPLICATION

The present patent application claims the right of priority under 35 U.S.C. §119 (a)-(d) of German Patent Application No. 10224898.2, filed Jun. 4, 2002.

BACKGROUND OF THE INVENTION

1. Field of the Invention

The invention relates to aqueous polymer dispersions based on polychloroprene, to a process for preparing them and to their use.

2. Description of the Related Art

Contact adhesives based on polychloroprene are predominantly solvent-based adhesives, which are applied to both of the substrates to be joined (adherends) and dried. Subsequent joining of the two adherends under pressure produces a bond with a high initial strength immediately after the joining operation. Subsequent crosslinking leads to the full, final cure.

On environmental grounds there is a growing need for suitable aqueous adhesive dispersions which can be processed to give corresponding aqueous adhesive formulations. A disadvantage of this system is that following the evaporation of the water the initial strength immediately after the joining operation is much lower than in the case of solvent-based adhesives. Adequate contacting of the adherends can therefore be achieved only by thermally activating the dry adhesive film beforehand. In addition, the possibility exists, by applying the adhesive by the "spray-mix" method, of achieving a sufficient wet strength instantaneously. With this method, the adhesive and also a coagulant are conveyed separately into a spray gun, mixed in the spray jet and coagulated. This operation is time-consuming and costly and is unsatisfactory from an economic standpoint. An overview of these methods is given, for example, in "Handbook of Adhesives", Irving Skeist, Chapman, Hall, N.Y., 3rd Ed. 1990, Part 15, page 301, R. Musch et al., Adhesives age, January 2001, page 17, "Spray-mixing adhesives based on Dispercoll®C for foam bonding", technical information bulletin from Bayer AG, No. KA-KR-0001d/01/05.96.

From the prior art it is known to use silica products for different applications. While solid $SiO_2$ products are widely used to control rheological properties, as fillers or adsorbents, in the case of silica sols the dominant application is that of binders for various inorganic materials, polishes for semiconductors, or flocculation partners in colloid-chemical reactions. EP-A 0 332 928, for example, discloses the use of polychloroprene lattices in the presence of silica sols as an impregnating layer in the production of fire protection elements. FR-2 341 537 or FR-2 210 699 describes pyrogenic silicas in combination with polychloroprene lattices for producing flame-retardant foam finishes or for bitumen enhancement, while JP-A 06256738 describes them in combination with chloroprene-acrylic acid copolymers.

BRIEF SUMMARY OF THE INVENTION

An object of the present invention is to provide an aqueous adhesive composition which, following application to the adherends and joining, has a high initial strength, especially in the wet state (wet strength).

It has been found that through a combination of polychloroprene dispersions and aqueous silicon dioxide dispersions it is possible to prepare adhesives which after bonding exhibit a high initial strength, wet strength and heat stability.

The present invention provides an aqueous polymer dispersion comprising
a) a polychloroprene dispersion having an average particle diameter of from 60 to 220 nm, preferably from 70 to 160 nm, and
b) an aqueous silicon dioxide dispersion having an average $SiO_2$ particle diameter of from 1 to 400 nm, preferably from 5 to 100 nm, with particular preference from 8 to 50 nm.

DETAILED DESCRIPTION OF THE INVENTION

Polychloroprene dispersions suitable in accordance with the invention are prepared by emulsion polymerization of chloroprene and an ethylenically unsaturated monomer copolymerizable with chloroprene in an alkaline medium, as disclosed, for example, in WO-A 02/24825 (p. 3, line 26-p. 7, line 4), DE-A 30 02 734 (p. 8, line 23-p. 12, line 9) or U.S. Pat. No. 5,773,544 (col. 2, line 9 to col. 4, line 45). More preferred polychloroprene dispersions are those prepared by continuous polymerization, as described, for example, in WO-A 02/24825, Example 2 and DE 3 002 734, Example 6, where the regulator content can be varied between 0.01% and 0.3%.

Aqueous dispersions of silicon dioxide have been known for a long time. Depending on the preparation procedure, they can be produced in a variety of structures.

Suitable silicon dioxide dispersions in accordance with the invention may be obtained from silica sol, silica gel, pyrogenic silicas or precipitated silicas or mixtures of these.

Silica sols are colloidal solutions of amorphous silicon dioxide in water, which are also referred to as silicon dioxide sols but are usually referred to for short as silica sols. The silicon dioxide therein is in the form of spherical, surface-hydroxylated particles. The diameter of the colloidal particles is generally from 1 to 200 nm, with the specific BET surface area that correlates with the particle size (determined by the method of G. N. Sears, Analytical Chemistry Vol. 28, N. 12, 1981-1983, December 1956) being fro m 15 to 2000 $m^2/g$. The surface of the $SiO_2$ particles has a charge which is compensated by a corresponding counterion, leading to the stabilization of the colloidal solution. The alkali-stabilized silica sols possess a pH of from 7 to 11.5 and comprise as alkalifying agents, for example, small amounts of $Na_2O$, $K_2O$, $Li_2O$, ammonia, organic nitrogen bases, tetraalkylammonium hydroxides or alkali metal or ammonium aluminates. Silica sols may also be in weakly acidic form, as semi-stable colloidal solutions. Furthermore, it is possible by coating the surface with $Al_2(OH)_5Cl$ to prepare cationically formulated silica sols. The solids concentrations of the silica sols are from 5 to 60% by weight $SiO_2$.

The preparation procedure for silica sols essentially encompasses the production steps of dealkalifying waterglass by ion exchange, setting and stabilizing the particular $SiO_2$ particle size (distribution) desired, setting the particular $SiO_2$ concentration desired, and, where appropriate, modifying the surface of the $SiO_2$ particles, with $Al_2(OH)_5Cl$, for example. In none of these steps do the $SiO_2$ particles leave the colloidally dissolved state. This explains the presence of the discrete primary particles which are highly effective as binders, for example.

By silica gels are meant colloidally formed or unformed silica of elastic to solid consistency with a pore structure varying from relatively loose to dense. The silica is in the form of highly condensed polysilicic acid. On the surface there are siloxane and/or silanol groups. The silica gels are prepared from waterglass by reaction with mineral acids. The primary particle size is generally from 3 to 20 nm and the specific surface area is from 250 to 1000 $m^2/g$ (according to DIN 66131).

A further distinction is made between pyrogenic silica and precipitated silica. In the precipitation process, water is introduced and then waterglass and acid, such as $H_2SO_4$, are added simultaneously. This produces colloidal primary particles which, as the reaction proceeds, undergo agglomeration and grow together to form agglomerates. The specific surface area is from 30 to 800 $m^2/g$ (DIN 66131) and the primary particle size is from 5 to 100 nm. The primary particles of these solid silicas are firmly crosslinked to form secondary agglomerates.

Pyrogenic (or fumed) silicas can be prepared by flame hydrolysis or by means of the light arc process. The predominant synthesis process for pyrogenic silicas is flame hydrolysis, in which tetrafluorosilane is decomposed in an oxyhydrogen flame. The silica formed in this process is X-ray-amorphous. Pyrogenic silicas possess significantly fewer OH groups on their virtually pore-free surface than precipitated silica. The pyrogenic silica prepared by flame hydrolysis has a specific surface area of from 50 to 600 $m^2/g$ (DIN 66131) and a primary particle size of from 5 to 50 nm; the silica prepared by the light arc process as a specific surface area of from 25 to 300 $m^2/g$ (DIN 66131) and a primary particle size of from 5 to 500 nm.

Further details on synthesis and properties of silicas in solid form can be found, for example, in K. H. Büchel, H.-H. Moretto, P. Woditsch "Industrielle Anorganische Chemie", Wiley VCH Verlag 1999, section 5.8.

Where an $SiO_2$ raw material present in the form of an isolated solid, such as pyrogenic or precipitated silica, is used for the polymer dispersion of the invention, it is converted into an aqueous $SiO_2$ dispersion by dispersing it.

To prepare the silicon dioxide dispersion, prior art dispersers are used, preferably those suitable for producing high shear rates, such as Ultraturrax or dissolver discs, for example.

Preference is given to using those aqueous silicon dioxide dispersions whose $SiO_2$ particles have a primary average particle diameter of from 1 to 400 nm, preferably from 5 to 100 nm and with particular preference from 8 to 50 nm. When precipitated silicas are used, they are ground in order to reduce the particle size.

Preferred polymer dispersions of the invention are those in which the $SiO_2$ particles of the silicon dioxide dispersion b) are present in the form of discrete, uncrosslinked primary particles.

It is likewise preferred for the $SiO_2$ particles to possess hydroxyl groups on the particle surface.

The aqueous silicon dioxide dispersion b) may be an aqueous silica brine. As aqueous silicon dioxide dispersions b) it is more preferred to use aqueous silica sols.

An important property of the silicas of the invention is their thickening effect in formulations comprising polychloroprene dispersions, which results in the adhesives thus prepared forming fine, sedimentation-stable dispersions, being easy to process, and having high stability even on porous adherends.

To prepare the polymer dispersions of the invention, the proportions of the individual components are chosen so that the resulting dispersion has a dispersed polymer content of from 30 to 60% by weight, the fractions of the polychloroprene dispersion (a) being from 60 to 99% by weight and of the silicon dioxide dispersion (b) being from 1 to 40% by weight, the percentages being based on the weight of non-volatile fractions and adding up to 100% by weight.

The polymer dispersions of the invention preferably contain a fraction of from 70% by weight to 98% by weight of a polychloroprene dispersion (a) and a fraction of from 2% by weight to 30% by weight of the silica sol dispersion (b), particular preference being given to the mixtures comprising 80% by weight to 93% by weight of dispersion (a) and 20% by weight to 7% by weight of dispersion (b), the percentages being based on the weight of non-volatile fractions and adding up to 100% by weight.

Where appropriate it is also possible for the polychloroprene dispersions to contain other dispersions, such as polyacrylate, polyvinylidene chloride, polybutadiene, polyvinyl acetate or styrene-butadiene dispersions, in a fraction of up to 30% by weight.

The polymer dispersions of the invention may comprise further adhesives or auxiliaries and additives. By way of example, fillers such as quartz flour, quartz sand, heavy spar, calcium carbonate, chalk, dolomite or talc, together where appropriate with wetting agents, for example polyphosphates, such as sodium hexametaphosphate, naphthalenesulphonic acid, ammonium salts or sodium salts of polyacrylic acids, can be added, the fillers being added in amounts of from 10 to 60% by weight, preferably from 20 to 50% by weight, and the wetting agents in amounts of from 0.2 to 0.6% by weight, all figures based on non-volatile fractions.

Further suitable auxiliaries are, for example, in amounts of from 0.01 to 1% by weight, based on non-volatile fractions, organic thickeners to be employed, such as cellulose derivatives, alginates, starch, starch derivatives, polyurethane thickeners or polyacrylic acid, or in amounts of from 0.05 to 5% by weight, based on non-volatile fractions, inorganic thickeners to be employed, such as bentonites, for example.

For preservation it is also possible to add fungicides to the adhesive composition of the invention. Fungicides are employed in amounts of from 0.02 to 1% by weight, based on non-volatile fractions. Examples of suitable fungicides are phenol derivatives and cresol derivatives or organotin compounds.

Where appropriate it is also possible to add tackifying resins, such as unmodified or modified natural resins such as rosin esters, hydrocarbon resins or synthetic resins such as phthalate resins, to the polymer dispersion of the invention in dispersed form (see, for example, in "Klebharze", R. Jordan, R. Hinterwaldner, pp. 75-115, Hinterwaldner Verlag Munich 1994). Preference is given to alkyl-phenolic resins and terpene-phenolic resin dispersions having softening points of more than 70° C., with particular preference more than 110° C.

Likewise possible is the use of organic solvents, such as toluene, xylene, butyl acetate, methyl ethyl ketone, ethyl acetate, dioxane or mixtures thereof, or plasticizers, such as those based on adipate, phthalate or phosphate, in amounts of from 0.5 to 10 parts by weight, based on non-volatile fractions.

The invention further provides a process for preparing the polymer dispersion of the invention, characterized in that the polychloroprene dispersion (a) is mixed with the silicon dioxide dispersion (b) and, where appropriate, the customary adhesives, auxiliaries and additives are added.

One preferred process for preparing the polymer dispersions of the invention is characterized in that first of all the polychloroprene dispersion (a) is mixed with the adhesives auxiliaries and additives, and the silica sols (b) are added during or after mixing.

It is preferred as an additive to use zinc oxide or magnesium oxide, as an acceptor for small amounts of hydrogen chloride which may be given off from the chloroprene polymers. These are added in amounts of from 0.1 to 10% by weight, preferably from 1 to 5% by weight, based on the non-volatile fractions, and may undergo partial hydrolysis in the presence of the polychloroprene dispersions (a) or may contain hydrolysable fractions. In this way it is possible to raise the viscosity of the polymer dispersion and to set it at a desired level. For ZnO, for example, this hydrolysation is described in "Gmelins Handbuch der anorganischen Chemie", 8th Edition, 1924, Verlag Chemie Leipzig, Vol. 32, pp. 134/135 and in supplementary Volume 32, Verlag Chemie, 1956, pp. 1001-1003. For MgO it is described, for example, in "Gmelins Handbuch der anorganischen Chemie", 8th Edition, 1939, Verlag Chemie Berlin, Vol. 27, pp. 12/13, 47-50, 62-64.

However, it is also possible to add other stabilizers, such as litharge, or additives which hydrolyse in the presence of alkaline polychloroprene dispersions.

If a relatively high viscosity of the polymer dispersions of the invention is unwanted, then additions of ZnO or MgO can be omitted without adversely affecting the storage stability of the product.

The adhesive formulation may be applied conventionally, for example by brushing, pouring, knife coating, spraying, rolling or dipping. The adhesive film can be dried at room temperature or an elevated temperature up to 220° C.

The polymer dispersions of the invention can be used as adhesives, for example for bonding any substrates of the same or different kind, such as of wood, paper, plastics, textiles, leather, rubber or inorganic materials, such as ceramic, stoneware, glass fibre or cement.

EXAMPLES

A. Substances Used

TABLE 1

Polychloroprene dispersions

| Dispersion | Polychloroprene type | Product |
|---|---|---|
| A | pH 12, strongly crystallizing, gel-free, solids content 55 +/− 0.5% | Dispercoll ® C 84, Bayer AG DE |
| B | pH 12, moderately strongly crystallizing, average gel content, solids content 58 +/− 0.5% | Dispercoll ® C 74, Bayer AG DE |
| C | pH 12, slowly crystallizing, gel-free, solids content 58 +/− 0.5% | Dispercoll ® C XP 2372H Bayer AG DE |

TABLE 2

Silicas

| Product | Supplier | Supplier form | Type |
|---|---|---|---|
| Ae 200 Experimental product | Degussa AG, Düsseldorf, DE | 20% dispersion | Pyrogenic silica |
| Cab-o-sperse ® GP50 | Cabot GmbH, Hanau, DE | 20% dispersion | Pyrogenic silica |
| Cab-o-sperse ® GP53/30 | Cabot GmbH, Hanau, DE | 20% dispersion | Pyrogenic silica |
| Cab-o-sperse ® GP/52/25 | Cabot GmbH, Hanau, DE | 25% dispersion | Pyrogenic silica |
| Silicasil ® S | Bayer AG, Lev., DE | Solid | Synthetic silica |
| Silicasil ® UV | Bayer AG, Lev., DE | Solid | Synthetic silica |
| Silicasil ® MG | Bayer AG, Lev., DE | Solid | Synthetic silica |
| Baysikal ® A | Bayer AG, Lev., DE | Solid | Na Al silicate |
| Baysilkal ® KN | Bayer AG, Lev., DE | Solid | Ca silicate |
| Vulkasil ® C | Bayer AG, Lev., DE | Solid | Precipitated silica |
| Levasil ® 50 | H.C. Starck GmbH, Goslar, DE | Dispersion, 30% | Silica sol |
| Levasil ® 100 | H.C. Starck GmbH, Goslar, DE | Dispersion, 30% | Silica sol |
| Levasil ® 200 | H.C. Starck GmbH, Goslar, DE | Dispersion, 30% | Silica sol |
| Levasil ® 300 | H.C. Starck GmbH, Goslar, DE | Dispersion, 30% | Silica sol |
| Waterglass | Cognis GmbH, Düsseldorf, DE | Solution | Sodium silicate |

TABLE 3

Additives and auxiliaries

| Product | Solids content | Function | Manufacturer |
|---|---|---|---|
| Rhenofit ® DDA-EM 50 | 50% | Ageing inhibitor | Bayer AG, DE |
| Bayoxide ® Z VP 9802 | 50% | Stabilizer | Borchers GmbH, DE |
| Dermulsene ® | 50% | Resin | Schenectady Europe S.A., FR |

B. Measurement Methods

1. Determination of the Peel Strength

The test is carried out in accordance with EN 1392. Two test specimens made of Nora rubber (styrene-butadiene rubber, SBR) or plasticized PVC (30% dioctyl phthalate, DOP) with the dimensions 100×30 mm, roughened with sandpaper (grain=80), are coated with a wet film of the dispersion 100 μm thick and aired at room temperature.

The specimens are then subjected to one of the following procedures:

Method A: shock activation followed by joining for 10 seconds at 4 bar, or

Method B: joining for 10 seconds at 4 bar, without activation.

A tensile test is carried out on a standard commercial tensile tester machine at room temperature. Measurements are made of the strengths immediately after bonding and after one day.

1.1. Shock Activation

The bond areas are irradiated for 4 seconds using an IR emitter from Funk (shock activator 2000). Depending on activation time, the film of adhesive on the Nora rubber heats up to 49° C., 65° C. or 115° C. A 10-second activation of the film of adhesive on the plasticized PVC sample produces a surface temperature of 92° C. Bonding takes place immediately after heat activation of the adhesive-coated test specimens, by placing the activated adhesive layers against one another and subjecting them to compression in a press. The test specimens thus produced are stored at 23° C. and 50% relative humidity.

2. Thermal Testing

The test specimens are placed under a load of 4 kg and conditioned to 40° C. in a heating cabinet over the course of 30 minutes. The specimens are then heated to 150° C. with a linear heating rate of 0.5° C./min. The softening temperature, i.e. the temperature in ° C. at which the bond fails under the 4 kg load, is recorded. 5 individual measurements are carried out in each case.

3. Measurement of the Contact Adhesion Time on Polyester/Cardboard ("open time")

Polyester film and white cardboard are supplied, and the dispersions are applied in a width of 5 mm using a film applicator, with a coating-bar aperture of 0.2 mm. The strips of polyester provided with the adhesive dispersion are stored in a controlled-climate area at 23° C. and 50% relative humidity. At intervals of 12 hours, pairs of cardboard strips are placed crosswise over one another and loaded for 10 seconds with a 50 g weight. The end of the contact adhesion time has been exceeded when, in an attempt to part the bond by hand, the films or the cardboard strips are no longer contactable.
Polyester film: Hostaphan RN 75/0, thickness: 0.075 mm.
Cardboard: White, wood-free cardboard, 0.32 mm thick, weight: 250 g/m².

4. Peel Strength After Bonding by the Hot Pressing Method (Beechwood/Unplasticized PVC)

4.1. Production of the Test Specimens

The adhesives of the invention are applied by brush to a planed beechwood board (in accordance with DIN 53-254, dimensions: 50×140×4 mm). The adhesive is applied only to one side of the beechwood test specimen. The bond area is 50×110 mm. After a drying time of 30 minutes at ambient temperature, a second layer of adhesive is applied over the first and the system is then dried at ambient temperature for 60 minutes. After the drying time, the system is pressed against the non-textured side of an unplasticized PVC laminating foil (type: Benelit foil RTF, dimensions: 50×210×0.4) in a membrane press at a joining temperature of 90° C. under an effective pressure of 4 bar for 10 seconds.

4.2. Determination of the Heat Stability

The joined specimens are stored at room temperature for 3 days. The heat stability is determined in a universal heating cabinet with automatic temperature regulation. The unbonded end of the beechwood test specimen is fastened at the top on a mount using a wing bolt. The protruding end of the PVC test strip is loaded at an angle of 180° with a 500 g weight acting vertically downwards. The initial temperature is 50° C. At 1-hour intervals, the temperature is raised automatically by 10° C. until complete detachment (or tearing) of the PVC strip from the wooden test specimen occurs.

5. Determination of the Thermal Stability (HCl Stability)

The dried adhesive samples are tested in accordance with DIN 53381.

Measurement Procedure:

The samples (0.1-1 mm thick) are cut to an edge length of approximately 2-3 mm and introduced into a test tube 15 cm high (wall thickness approximately 0.4 cm, diameter 1.8 cm) to a height of 5 cm. A cork stopper is fitted with a glass tube (length 10 cm, internal diameter 3 mm) and an indicator paper (Congo red paper, length 3 cm, width 1 cm) is inserted into the tube. The indicator paper should be 2.5 cm from the sample. The measurement, carried out in duplicate, takes place at 180° C. in an oil bath. The measurement is over when the indicator paper changes color from red to blue.

C. Preparation of the Adhesive Composition

Based on Polychloroprene Dispersions

TABLE 4

Preparation of the formulation

| | Formula (amounts in parts by weight) | | | | | | | | | | | |
|---|---|---|---|---|---|---|---|---|---|---|---|---|
| Product | 1* | 2 | 3 | 4 | 5* | 6 | 7 | 8 | 9* | 10 | 11 | 12* |
| Polychloroprene dispersion: | | | | | | | | | | | | |
| A | | | | | 100 | 100 | 100 | 100 | 100 | 100 | 70 | 70 |
| B | 100 | 100 | 100 | 100 | | | | | | | | |
| C | | | | | | | | | | | 30 | 30 |
| Silicone dioxide type (depending on application) | — | 5 | 10 | 15 | — | 5 | 10 | 15 | — | 30 | 30 | — |
| Rhenofit ® DDA-EM 50 | 2 | 2 | 2 | 2 | 2 | 2 | 2 | 2 | 2 | 2 | 2 | 2 |
| Bayoxide ® Z, VP 9802 | 4 | 4 | 4 | 4 | 4 | 4 | 4 | 4 | 4 | 4 | 4 | 4 |
| Dermulsene ® | 30 | | | | 30 | | | | 30 | | | 30 |

*Comparative example

To prepare the formulation, the polychloroprene dispersion is placed in a glass beaker. With stirring, the stabilizer, the ageing inhibitor, zinc oxide (ZnO) and the resin and the silicon dioxide are added. In the examples below, the type of silicon dioxide used is stated.

D. Results

1. Determination of the Contact Adhesion Time 1.1 On Polyester Film
   Silicon dioxide type: Levasil® 300

TABLE 5

Determination of the contact adhesion time

| Example | | Contact adhesion time (+ = sticks/− = doesn't stick) Time in minutes | | | | | | |
|---|---|---|---|---|---|---|---|---|
| No. | Formula | 5 | 15 | 30 | 45 | 60 | 120 | 180 |
| 1* | 1 | + | + | − | − | − | − | − |
| 2 | 2 | + | + | + | + | + | − | − |
| 3 | 3 | + | + | + | + | + | − | − |
| 4 | 4 | + | + | + | + | − | − | − |
| 5* | 5 | + | − | − | − | − | − | − |
| 6 | 6 | + | + | + | + | + | + | − |
| 7 | 7 | + | + | + | + | + | + | − |
| 8 | 8 | + | + | + | + | + | − | − |

*Comparative example 1.2 On Cardboard
   Silicon dioxide type: Levasil® 300

TABLE 6

Determination of the contact adhesion time

| Example | | Contact adhesion time (+ = sticks/− = doesn't stick) Time in minutes | | | | | | |
|---|---|---|---|---|---|---|---|---|
| No. | Formula | 5 | 15 | 30 | 45 | 60 | 120 | 180 |
| 9* | 1 | + | + | − | − | − | − | − |
| 10 | 2 | + | + | + | + | + | − | − |
| 11 | 3 | + | + | + | + | + | − | − |
| 12 | 4 | + | + | + | − | − | − | − |
| 13* | 5 | + | − | − | − | − | − | − |
| 14 | 6 | + | + | + | + | + | − | − |
| 15 | 7 | + | + | + | + | + | + | − |
| 16 | 8 | + | + | + | + | − | − | − |

*Comparative example

As is evident from the two Tables 5 and 6, replacing the resin in formula 1 and 5 by the silica sol of the invention in formulas 2 to 4 and 6 to 8 brings about a distinct prolongation of the contact adhesion time.

2. Adjustment to the Viscosity of the Formulations by Partially Hydrolysable Additives 2.1 Addition of ZnO
   Formula 10

TABLE 7

(Amounts of the ingredients in parts by weight of dispersion)

| Example | $SiO_2$ type = | | Viscosity (mPas) | | |
|---|---|---|---|---|---|
| No. | Levasil® 300 | ZnO | Immediate | 30 min | 60 min |
| 17* | 30 | 0 | 16.4 | 16.9 | 16.6 |
| 18 | 30 | 0.5 | 16.4 | 5800 | 18000 |
| 19 | 30 | 1.0 | 17.5 | 8800 | 20600 |
| 20 | 30 | 1.5 | 17.5 | 11200 | 22000 |
| 21 | 30 | 2.0 | 17.5 | 11800 | 22500 |
| 22 | 30 | 2.5 | 17.8 | 12400 | 23600 |
| 23 | 30 | 3.0 | 17.8 | 12600 | 24000 |
| 24 | 30 | 3.5 | 18.0 | 13400 | 25000 |
| 25 | 30 | 4.0 | 18.0 | 13600 | 25600 |

*Comparative example 2.2 Addition of Different Types of Levasil®
   Formula 10
   Use of Polychloroprene Dispersion A or B

TABLE 8

| Ex. | | | Viscosity after days (mPas) | | | | |
|---|---|---|---|---|---|---|---|
| No. | Dispersion | Levasil® | 0 | 1 | 2 | 7 | 9 |
| 26 | B | 50 | 26 | 141 | 221 | 406 | 790 |
| 27 | B | 100 | 21 | 1060 | 1450 | 2620 | 2920 |
| 28 | B | 200 | 22 | 10000 | 11050 | 11100 | 12100 |
| 29 | B | 300 | 18 | 16000 | 144000 | 765000 | — |
| | | | 15 | 20 | 24 | 33 | |
| 26 | B | 50 | 1170 | 1120 | 1000 | 1050 | |
| 27 | B | 100 | 2900 | 2880 | 2880 | 3000 | |
| 28 | B | 200 | 12050 | 11800 | 11700 | 11900 | |
| 29 | B | 300 | 1700000 | — | 1760000 | — | |
| | | | Viscosity after days (mPas) | | | | |
| | | | 0 | 1 | 4 | 6 | 11 | 14 |
| 30 | A | 50 | 34 | 323 | 520 | 540 | 580 | 630 |
| 31 | A | 100 | 120 | 3730 | 5200 | 6300 | 7300 | 7400 |

TABLE 8-continued

|    |   | | Viscosity after hours (mPas) | | | | |
| --- | --- | --- | --- | --- | --- | --- | --- |
|    |   |     | 0   | 1     | 2      | 3     | 4     |
| 32 | A | 200 | 246 | 9950  | 35250  | 40000 | 79400 |
| 33 | A | 300 | 600 | 16400 | 126000 | —     | —     |

|    |   |     | 5     | 7     | 14     | 22     |
| --- | --- | --- | --- | --- | --- | --- |
| 32 | A | 200 | 84000 | 88300 | 520000 | 576000 |
| 33 | A | 300 | —     | —     | —      | —      |

Tables 7 and 8 indicate how the viscosity of the formulations can be raised and their viscosity level adjusted through the choice of the type of silica sol and the concentration of partially hydrolysable zinc oxide, without adding additional thickeners.

3. Peel Strength 3.1 Determination of the Initial Strength on Nora/Nora Bonds

SiO$_2$ type: Levasil®300

Joining Method A (Joining After Shock Activation):

TABLE 9

| | t = open time before joining | |
| --- | --- | --- |
| t (min) | Immediate peel strength formula 9 (N/mm) | Immediate peel strength formula 10 (N/mm) |
| 20 | 1.6 | 2.7 |
| 25 | 2.1 | 2.8 |
| 30 | 2.1 | 2.9 |
| 35 | 2.2 | 2.8 |
| 40 | 2.3 | 2.8 |
| 45 | 2.4 | 3.0 |
| 50 | 2.6 | 3.4 |
| 55 | 2.6 | 3.6 |
| 60 | 2.7 | 4.0 |

Joining method B (Joining Without Shock Activation):

TABLE 10

| | t = open time before joining | |
| --- | --- | --- |
| t (min) | Immediate peel strength formula 9 (N/mm) | Immediate peel strength formula 10 (N/mm) |
| 20 | 1.3 | 2.0 |
| 25 | 1.9 | 3.1 |
| 30 | 2.2 | 3.1 |
| 35 | 2.3 | 3.2 |
| 40 | 2.5 | 3.4 |
| 45 | 2.4 | 3.6 |
| 50 | 2.6 | 3.5 |
| 55 | 2.6 | 3.6 |
| 60 | 2.4 | 3.5 |

Tables 9 and 10 show that, through the use of polymer dispersions of the invention it is possible to prepare adhesives having a long open time and high initial strength (formula 10). This effect is achieved even without thermal activation of the adhesive film beforehand by its joining method (B).

3.2 Determination of the Wet Strength

Example: leather/leather bonds

SiO$_2$ type: Levasil®300

TABLE 11

| | t = open time before joining | |
| --- | --- | --- |
| t (min) | Immediate peel strength formula 12 (N/mm) | Immediate peel strength formula 11 (N/mm) |
| 0.5 | 0 | 0.6 |
| 1 | 0 | 0.9 |
| 1.5 | 0 | 1.2 |
| 2 | 0 | 1.2 |
| 2.5 | 0 | 1.3 |
| 3 | 0 | 1.3 |
| 4 | 0 | 1.4 |
| 5 | 0 | 1.6 |
| 6 | 0 | 1.4 |
| 7 | 0.1 | 1.4 |
| 8 | 0.3 | 1.3 |
| 9 | 0.6 | 1.3 |
| 10 | 0.6 | 1.3 |

Table 11, taking as its example the bonding of leather, shows how by adding silica sol it is possible to achieve a marked increase in the wet strength of the adhesive formulation (formula 11) as compared with the state of the art (formula 12).

3.3 Measurement of the Peel Strength on Nora/Nora Test Specimens

Conditions

Open time before joining=60 min.

Joining method: A

TABLE 12

| Dispersion | Formula | Levasil® 300 | Immediate peel strength (N/mm) | 9 days |
| --- | --- | --- | --- | --- |
| A | 9  | — | 2.2 | 4.0 |
| A | 10 | + | 4.0 | 8.3 |

4. Determination of the Heat Stability on Nora Test Specimens

TABLE 13

| Dispersion | Formula | Levasil type | Heat stability (° C.) |
| --- | --- | --- | --- |
| B | 9  | —   | 64.5 |
| B | 10 | 50  | 125 |
| B | 10 | 100 | 128 |
| B | 10 | 300 | 147 |

As evident from Tables 12 and 13, the addition of silica sol significantly increases the strength of the bonds and the heat stability of the bonds as compared with the state of the art (formula 9).

5. Measurement of Peel Strength and Heat Stability of Wood/PVC

Condition:

Activation temperature 110° C.

TABLE 14

| Polychloroprene disp. | Formula | Levasil ® 50 | Peel strength (N/mm) | | Heat stability ° C. |
|---|---|---|---|---|---|
| | | | Immediate | 9 days | |
| A | 9 | – | 1.8 | 4.0 | 80 |
| A | 10 | + | 3.0 | 6.3 | 120 |

In analogy to the results in Tables 12 and 13 (bonding of SBR rubber), the bonding of other substrates, such as wood/PVC, also provides visible evidence of the positive effects of silica sol in formula 10.

6. Comparison of the Properties of Different Silicon Dioxides in Adhesive Formulations Based on Polychloroprene Dispersions Conditions:

Formula 10

Nora test material, 15 min open time,

Joining Method B (Without Shock Activation)

In formula 10 the weight of nonvolatile fractions of the different silicon dioxide types was chosen so as to correspond to the weight of nonvolatile fractions when using 30 parts by weight of Levasil®.

A comparison of the activity of different silicate dispersion types shows that different products with polychloroprene dispersions do not form stable dispersions and coagulate or, after a short period of storage, undergo sedimentation. This relates to the synthetic silicas and Na Al silicates. Precipitated silicas and sodium silicate, although leading to stable dispersions, do not have a thickening effect. Pyrogenic silicas feature a slight thickening effect, but do not exhibit good peel strength when bonded cold. Silica sols, on the other hand, have a thickening effect in the adhesive formulation and raise the strength of the bond.

7. Effect of Silica Sol on the HCl Stability of Polychloroprene Adhesive Formulations

TABLE 16

| Formula (without ZnO) | Levasil ® type | HCl stability (min) |
|---|---|---|
| 9 | — | 75 |
| 10 | 50 | 100 |
| 10 | 100 | 130 |
| 10 | 200 | 180 |
| 10 | 300 | 240 |

The addition of silica sol produces additional thermal stabilization of the adhesive bond.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for bonding substrates comprising
   a) coating a surface of each substrate with an aqueous polymer dispersion comprising
      i) dispersed polychloroprene particles having an average particle diameter of from 60 to 220 nm and

TABLE 15

| Product | Supplier form | Type | Peel strength (N/mm) | | Thickener effect* |
|---|---|---|---|---|---|
| | | | immediate | 6 days | |
| Ae 200 | Dispersion | Pyrogenic silica | 0.8 | 2.1 | + |
| Cab-o-sperse ® GP50 | Dispersion | Pyrogenic silica | 3.3 | 3.9 | + |
| Cab-o-sperse ® GP53/30 | Dispersion | Pyrogenic silica | 2.7 | 2.2 | + |
| Cab-o-sperse ® GP/52/25 | Dispersion | Pyrogenic silica | 2.9 | 3.5 | + |
| Silicasil ® S | Solid | Synth. silica | — | — | coag. |
| Silicasil ® UV | Solid | Synth. silica | — | — | coag. |
| Silicasil ® MG | Solid | Synth. silica | — | — | coag. |
| Baysikal ® A | Solid | Na Al silicate | 3.2 | 4.0 | sedimentation |
| Baysilkal ® KN | Solid | Ca silicate | 4.1 | 5.9 | coag. |
| Vulkasil ® C | Solid | Precip. silica | 2.2 | 3.8 | – |
| Levasil ® 50 | Dispersion | Silica sol | 4.2 | 5.2 | ++ |
| Levasil ® 100 | Dispersion | Silica sol | 2.5 | 3.6 | +++ |
| Levasil ® 200 | Dispersion | Silica sol | 4.8 | 5.6 | ++++ |
| Levasil ® 300 | Dispersion | Silica sol | 3.9 | 0.7 | +++++ |
| Water glass | Solution | Sodium silicate | 5.2 | 2.0 | – |

*Thickening effect:
–none, + = slight, ++ = good, +++ = very good, ++++ = excellent ii) dispersed silicon dioxide particles having an average SiO$_2$ particle diameter of from 1 to 400 nm, and b) joining the surfaces.

2. The method of claim 1 wherein the SiO$_2$ particles have average particle diameters of from 50 to 100 nm.

3. The method of claim 1 wherein the SiO$_2$ particles have average particle diameters of from 8 to 50 nm.

4. The method of claim 1 wherein the SiO$_2$ particles are in the form of discrete, non-crosslinked primary particles.

5. The method of claim 1 wherein the SiO$_2$ particles possess hydroxyl groups on the particle surface.

6. The method of claim 1 wherein the dispersed silicon dioxide particles are in the form of a silica sol.

7. The method of claim 2 wherein the dispersed silicon dioxide particles are in the form of a silica sol.

8. The method of claim 3 wherein the dispersed silicon dioxide particles are in the form of a silica sol.

9. The method of claim 1 wherein the aqueous polymer dispersion comprises at least one of zinc oxide and magnesium oxide.

10. Substrates bonded together with an aqueous polymer dispersion comprising i) dispersed polychloroprene particles having an average particle diameter of from 60 to 220 nm and ii) dispersed silicon dioxide particles having an average SiO$_2$ particle diameter of from 1 to 400 nm.

11. The method of claim 10 wherein the SiO$_2$ particles have average particle diameters of from 50 to 100 nm.

12. The method of claim 10 wherein the SiO$_2$ particles have average particle diameters of from 8 to 50 nm.

13. The method of claim 10 wherein the SiO$_2$ particles are in the form of discrete, non-crosslinked primary particles.

14. The method of claim 10 wherein the SiO$_2$ particles possess hydroxyl groups on the particle surface.

15. The method of claim 10 wherein the dispersed silicon dioxide particles are in the form of a silica sol.

16. The method of claim 11 wherein the dispersed silicon dioxide particles are in the form of a silica sol.

17. The method of claim 12 wherein the dispersed silicon dioxide particles are in the form of a silica sol.

18. The method of claim 10 wherein the aqueous polymer dispersion comprises at least one of zinc oxide and magnesium oxide.

* * * * *